UNITED STATES PATENT OFFICE 2,641,567

METHOD OF PRODUCING PENICILLINS

David Perlman, Princeton, and Asger F. Langlykke, Highland Park, N. J., assignors to Mathieson Chemical Corporation, New York, N. Y., a corporation of Virginia No Drawing. Application February 25, 1950, Serial No. 146,401

2 Claims. (Cl. 195—36)

This invention relates to, and has for its object, the improvement of, methods of producing penicillins by culturing penicillin-producing organisms.

Prior to this invention, penicillins have been obtained by culturing various penicillin-producing organisms in contact with liquid nutrient media of various compositions. These media essentially comprised a source of nitrogenous and growth-promoting substances (e. g., cornsteep liquor), and a carbohydrate (e. g., glucose or lactose) as an assimilable source of carbon and energy; and generally also, a precursor for the penicillin particularly desired, e. g., phenylacetic acid for the production of penicillin G. Thus, penicillin G has been produced by growing the organism *Penicillium chrysogenum* submerged in an aqueous medium containing cornsteep liquor, lactose, calcium carbonate, and phenylacetic acid.

It has been found that penicillins may advantageously be produced by culturing a penicillin-producing organism, especially *Penicillium chrysogenum*, in contact with a liquid nutrient medium comprising a fatty oil, the amount of any other assimilable source of carbon and energy in the medium being substantially less than the total caloric requirement of the culture. In other words, it has been found that the carbohydrate, used as the assimilable source of carbon and energy in culturing a penicillin-producing organism in contact with a liquid nutrient medium, may be partially or completely replaced with a fatty oil, and that such replacement is generally advantageous from the standpoint of penicillin yield and/or the lower price and greater availability of the fatty oil. By replacement of the carbohydrate is meant, of course, employment of the fatty oil instead of carbohydrate as source of carbon and energy.

In general, the conditions of culturing the penicillin-producing organism require no alteration on replacing the carbohydrate in part or whole with a fatty oil; nor do the processes of recovering and/or purifying the penicillins require modification with such change of medium composition. Moreover, production of the desired penicillin where mixtures are ordinarily produced (e. g., production of penicillin G) is not significantly affected.

Among the fatty oils utilizable for the purposes of this invention are: lard oil, soybean oil, linseed oil, cottonseed oil, peanut oil, coconut oil, corn oil, castor oil, sesame oil, crude palm oil, sperm oil, olive oil, and triolein.

Preferably, the replacement of the carbohydrate is on a weight basis, but it may be on a caloric basis (i. e., the caloric equivalent of the amount of carbohydrate priorly used, which amount was generally selected from the standpoint of optimum yield of penicillin). Even if replacement on a weight basis gave no increase of yield, the much lower price (per unit of weight) of the fatty oils than carbohydrates such as lactose would make the process of this invention advantageous; other advantages being the year-round and geographically-wider availability of the fatty oils. To maximize the advantages obtained by the practice of this invention, a substantial portion of the carbohydrate, and preferably the major portion, should be so replaced.

The carbohydrate component of media used for culturing penicillin-producing organisms may be replaced by a fatty oil regardless of the nature of the other components. Thus, such replacement is effective whether the medium contains cornsteep liquor or other source of nitrogenous and growth-promoting substances, or is synthetic (i. e., contains simple, synthesizable organic and inorganic compounds in place of such component).

Although it is preferred that the fatty oil used be relatively-pure, various technical grades and mixtures available may be used for the purposes of this invention. Also, the carbohydrate component may be replaced by a combination of any two or more fatty oils.

The following examples are illustrative of the invention [in the control fermentations described, there is added per liter medium 2.5 ml. of octadecanol dispersed in lard oil (3% w. v.) for the purpose of foam control]:

Example 1

An aqueous medium containing, per liter, 48 g. cornsteep liquor, 25 g. cottonseed oil, 5 g. glucose, 1 g. N-(2-hydroxyethyl)-phenylacetamide, and 10 g. $CaCO_3$ is distributed into 250 ml. Erlenmeyer flasks (50 ml. per flask); and the flasks are plugged with nonabsorbent cotton and sterilized in the usual manner (by autoclaving). When cool, each of the flasks is inoculated with 5% of a vegetative inoculum [the 48-hour vegetative growth of *Penicillium chrysogenum* (Wis. 48–749) grown in a medium containing cornsteep liquor and brown sugar], and the flasks are mechanically shaken (e. g., on rotary shaker at 285 R. P. M.) at 24° C. for 6 days. The penicillin potency of the culture liquid is about 935 units/ml., and its penicillin G content about 98%.

[A control fermentation with 25 g. lactose in place of the cottonseed oil yields a culture liquid whose penicillin potency is about 752 units/ml., the penicillin G content of which is about 98%.]

The penicillin content of the culture liquid may be recovered in the same manner as from the culture liquids obtained with the conventional carbohydrate media.

The following tabulation illustrates the results obtained under the conditions of the foregoing example with equal weights of other fatty oils in place of cottonseed oil (the fermentation time being 4, 5 and 6 days as indicated), the results given hereinbefore being repeated in the tabulation for completeness:

| Fatty oil or lactose | Penicillin potency of culture liquid, and (parenthetically) percentage penicillin G (both approximate) | | |
|---|---|---|---|
| | 4 days | 5 days | 6 days |
| Lactose | 395 (98) | 695 | 752 (98) |
| Lard oil | 463 (98) | 733 | 835 (100) |
| Soybean oil | 595 (97) | 682 | 800 (100) |
| Linseed oil | 385 (100) | 598 | 763 (100) |
| Cottonseed oil | 463 (100) | 753 | 935 (98) |
| Peanut oil | 710 (100) | 810 | 680 (100) |
| Coconut oil | 516 (100) | 635 | 737 (100) |

The following tabulation illustrates the results obtained under the conditions of the foregoing example on replacing carbohydrate on a caloric (rather than weight basis, as described hereinbefore), the fermentation conditions with the lactose control being substantially the same as in the foregoing example.

| Fatty oil or lactose, and amount (g./liter medium) | Penicillin potency of culture liquid and (parenthetically) percentage penicillin G (both approximate) | |
|---|---|---|
| | 3 days | 4 days |
| Lactose, 25 | 465 | 699 (98) |
| Soybean oil, 11 | 673 | 731 (99) |
| Lard oil, 11 | 553 | 615 (100) |

*Example 2*

An aqueous medium containing per liter

| | Grams |
|---|---|
| Cornsteep liquor | 48 |
| Lactose | 6.25 |
| Glucose | 5 |
| Cottonseed oil | 18.75 |
| CaCO$_3$ | 10 |
| N-(2-hydroxyethyl)-phenylacetamide | 1 | is distributed into Erlenmeyer flasks, and the flasks are plugged and sterilized as described in Example 1. Each flask is then inoculated with 5% of a 40-hour vegetative growth of *Penicillium chrysogenum* (Wis. 48-749) culture growth on a (cornsteep liquor)-(brown sugar) medium, and shaken at 24° C. for 5 days. The penicillin potency of the culture liquid is about 795 units/ml.

[A control fermentation with 18.75 g. lactose in place of the cottonseed oil yields a culture liquid whose penicillin potency is about 729 units/ml.]

The following tabulation illustrates the results obtained under the conditions of the foregoing example with equal weights of other fats in place of the cottonseed oil (hence illustrates the utilizability of fats generally as replacement for part of the lactose):

| Fat | Penicillin potency, units/ml. (approximate) |
|---|---|
| Linseed oil | 750 |
| Castor oil | 700 |
| Peanut oil | 839 |
| Soybean oil | 757 |
| Lard oil | 748 |
| Sesame oil | 800 |
| Coconut oil | 647 |
| Corn oil | 795 |
| Crude palm oil | 695 |

*Example 3*

An aqueous medium containing per liter

| | Grams |
|---|---|
| Liver and glandular tankage (composition comprising liver and other gland residues from packing houses) | 41 |
| Glucose | 5 |
| Lactose | 6.25 |
| Soybean oil | 18.75 |
| CaCO$_3$ | 10 |
| N-(2-hydroxyethyl)-phenylacetamide | 1 | is distributed into Erlenmeyer flasks, and the flasks are plugged and sterilized as described in Example 1. Each flask is then inoculated with 5% of a 48-hour vegetative growth of *Penicillium chrysogenum* (Wis. 47-749) culture grown on a (liver and glandular tankage)-(brown sugar) medium, and shaken at 24° C. for 4 days. The penicillin potency of the culture liquid is about 855 units/ml.

[A control fermentation with 25 g. lactose in place of the lactose and soybean oil yields a culture liquid whose penicillin potency is about 735 units/ml.]

The following tabulation illustrates the results obtained under the conditions of the foregoing example with other fatty oils and other proportions of fatty oil to lactose (partial and complete replacement):

| Lactose and/or fatty oil | Amount (g./liter medium) | Penicillin potency, units/ml. (approximate) |
|---|---|---|
| Lactose | 3.15 | 570 |
| Soybean oil | 21.88 | |
| Soybean oil | 25 | 750 |
| Lactose | 6.25 | 570 |
| Lard oil | 18.75 | |
| Lactose | 3.15 | 570 |
| Lard oil | 21.88 | |
| Lard oil | 25 | 535 |

*Example 4*

An aqueous medium containing per liter

| | Grams |
|---|---|
| Lactose | 7.5 |
| Lard oil | 7.5 |
| Acetic acid | 4 |
| KNO$_3$ | 3.5 |
| CuSO$_4$·5H$_2$O | 0.005 |
| Glucose | 5 |
| FeSO$_4$·7H$_2$O | 0.2 |
| ZnSO$_4$·7H$_2$O | 0.04 |
| KH$_2$PO$_4$ | 2 |
| NH$_4$NO$_3$ | 5 |
| MgSO$_4$·7H$_2$O | 0.5 |
| Phenylacetic acid | 4 |

(added in 1 g. portions after 1, 2, 3 and 4 days incubation)

adjusted to pH6.1 with KOH, is distributed into Erlenmeyer flasks, and the flasks are plugged and sterilized as described in Example 1. Each flask is then inoculated with 5% of a 48-hour vegetative growth of *Penicillium chrysogenum* (Wis. 48-749) culture grown on a cornsteep liquor medium, and shaken at 24° C. for 5 days. The penicillin potency of the culture liquid is about 474 units/ml.

[A control fermentation with 15 g. lactose in place of the lactose and lard oil yields a culture liquid whose penicillin potency is about 375 units/ml.]

The following tabulation illustrates the results obtained under the conditions of the foregoing example with other fatty oils and other proportions of fatty oil to lactose:

| Lactose and/or fatty oil | Amount (g./liter medium) | Penicillin potency, units/ml. (approximate) |
|---|---|---|
| Lactose | 3.75 | 615 |
| Soybean oil | 11.25 | |
| Lactose | 7.5 | 578 |
| Soybean oil | 7.5 | |
| Soybean oil | 15 | 607 |
| Lactose | 3.75 | 688 |
| Lard oil | 11.25 | |
| Lard oil | 15 | 898 |

Example 5

An aqueous medium containing per liter

|  | Grams |
|---|---|
| Peanut meal | 30 |
| Lard oil | 25 |
| $CaCO_3$ | 10 |
| N-(2-hydroxyethyl)-phenylacetamide | 1 | is distributed into Erlenmeyer flasks, and the flasks are plugged and sterilized as described in Example 1. Each flask is then inoculated with 5% of a 48-hour vegetative growth of *Penicillium chrysogenum* (Wis. 48-749) culture grown on a medium containing 20 g./liter nitrogen source and 20 g./liter glucose, and shaken at 24° C. for 4 days. The penicillin potency of the culture liquid is about 990 units/ml.

[A control fermentation with an equal weight of lactose in place of the lard oil yields a culture liquid whose penicillin potency is about 540 units/ml.]

The following tabulation illustrates the results obtained under the conditions of the foregoing example with other fatty oils as energy sources and/or other seed meal nitrogen sources:

| Nitrogen source (30 g./liter medium) | Energy source (25 g./liter medium) | Penicillin production, units/ml. (approximate) |
|---|---|---|
| Cottonseed meal | Lactose | 285 |
| Do | Soybean oil | 383 |
| Do | Lard oil | 420 |
| Do | Cottonseed oil | 420 |
| Linseed meal | Lactose | 280 |
| Do | Soybean oil | 270 |
| Do | Lard oil | 252 |
| Do | Linseed oil | 280 |
| Soybean meal | Lactose | 442 |
| Do | Soybean oil | 465 |
| Do | Lard oil | 550 |
| Peanut meal | Soybean oil | 510 |
| Do | Peanut oil | 885 |

The invention may be variously otherwise embodied within the scope of the appended claims.

We claim:

1. The method which comprises culturing a penicillin-producing Penicillium in contact with a liquid nutrient medium containing not more than about 1.25% of a carbohydrate source of carbon and energy, the remaining caloric requirement of the culture being provided by a fatty oil.

2. The method which comprises culturing a penicillin-producing Penicillium in contact with a liquid nutrient medium containing not more than about 1.25% of a carbohydrate source of carbon and energy, the remaining caloric requirement of the culture being provided by a fatty oil, the quantity of fatty oil being at least about 0.75%.

DAVID PERLMAN.
ASGER F. LANGLYKKE.

References Cited in the file of this patent

UNITED STATES PATENTS

| Number | Name | Date |
|---|---|---|
| 2,437,918 | McCormack | Mar. 16, 1948 |
| 2,448,791 | Foster et al. | Sept. 7, 1948 |
| 2,458,495 | Foster | Jan. 11, 1949 |
| 2,519,902 | Haller | Aug. 22, 1950 |
| 2,538,721 | Collingsworth | Jan. 16, 1951 |

OTHER REFERENCES

Penicillin Research Progress Report No. 6, May 27, 1944, Departments of Biochemistry etc., University of Wisconsin, W. P. B. Contract 118, page 2.

Penicillin Research Progress Report No. 10, Aug. 5, 1944, page 3. Foster et al., "Journal of Bacteriology," May 1946, pages 597 and 598.